United States Patent [19]
Sawamoto et al.

[11] Patent Number: 5,205,994
[45] Date of Patent: Apr. 27, 1993

[54] ELECTROLYTIC OZONE GENERATOR

[75] Inventors: Isao Sawamoto, Kanagawa; Takayuki Shimamune, Tokyo, both of Japan

[73] Assignee: Permelec Electrode, Ltd., Kanagawa, Japan

[21] Appl. No.: 755,424

[22] Filed: Sep. 4, 1991

[30] Foreign Application Priority Data

Sep. 6, 1990 [JP] Japan .................................. 2-236210

[51] Int. Cl.$^5$ .............................................. B01J 19/08
[52] U.S. Cl. ................................. 422/186.07; 204/128
[58] Field of Search ........................... 422/186, 186.07; 204/128, 129, 149, 152, 295, 296, 294

[56] References Cited

U.S. PATENT DOCUMENTS

| | | | |
|---|---|---|---|
| 1,581,944 | 4/1926 | Hausmeister | 204/149 |
| 3,623,970 | 11/1971 | Haas | 204/314 |
| 3,900,377 | 8/1975 | Enns et al. | 204/149 |
| 4,190,515 | 2/1980 | Butler et al. | 204/266 |
| 4,311,569 | 1/1982 | Dempsey et al. | 204/129 |
| 4,470,891 | 9/1984 | Moore et al. | 204/98 |
| 4,596,648 | 6/1986 | Sweeney | 204/237 |
| 4,761,208 | 8/1988 | Gram et al. | 204/95 |
| 4,804,449 | 2/1989 | Sweeney | 204/256 |
| 4,836,929 | 6/1989 | Baumann et al. | 210/638 |
| 4,978,438 | 12/1990 | Shimamune et al. | 204/265 |

Primary Examiner—Donald P. Walsh
Assistant Examiner—Daniel J. Jenkins
Attorney, Agent, or Firm—Sughrue, Mion, Zinn, Macpeak & Seas

[57] ABSTRACT

An electrolytic ozone generator is described, which comprises a feed tank in which water is stored, an ion-exchange column connected to the feed tank, a pump for feeding the stored water in the feed tank to the ion-exchange column, an electrolytic cell connected to the ion-exchange column and containing a solid electrolyte which is an ion-exchange membrane, an anode disposed tightly on one side of the solid electrolyte, and a cathode disposed tightly on the other side of the solid electrolyte, an electromagnetic valve connected to and disposed between the ion-exchange column and the electrolytic cell, and a hydrogen-separating column connected to the electrolytic cell and for separating hydrogen from a gas-liquid mixture sent from the electrolytic cell and circulating the resulting water to the feed tank, and in which the liquid level of the anolyte in the electrolytic cell is sensed, and, in a case wherein said liquid level is below a predetermined value, ion-exchanged water is fed from the ion-exchange column to the electrolytic cell by controlling the electromagnetic valve.

2 Claims, 1 Drawing Sheet

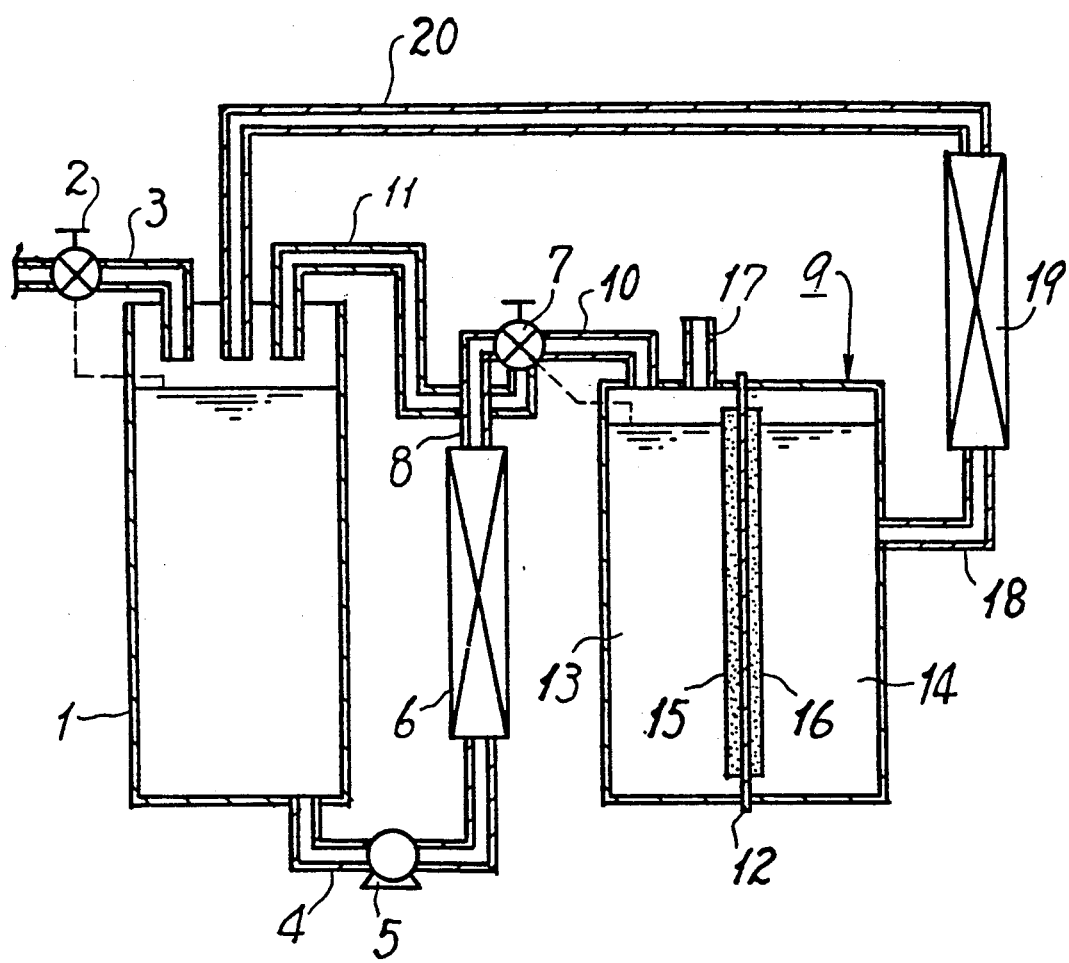

5,205,994

ELECTROLYTIC OZONE GENERATOR

FIELD OF THE INVENTION

The present invention relates to an ozone generator which produces ozone through water electrolysis. More particularly, the invention relates to an ozone generator for producing ozone gas or ozone-containing water for use in the treatment of swimming-pool water, wafer treatment in semiconductor production processes, or chemical reactions.

BACKGROUND OF THE INVENTION

Ozone as a powerful and clean oxidizing agent has been attracting increased attention. The use of ozone particularly for water treatment has been increasing since treatment with ozone is advantageous, for example, in that because the product of ozone decomposition is oxygen, ozone-treated water is not caused to contain any residual substance, unlike conventional chlorine-treated water, and in that the decomposition rate of ozone is so high that ozone itself does not remain in the treated water; hence, there are no problems of secondary pollution. For producing ozone which is a useful oxidizing agent as described above, electrical discharge methods and electrolytic methods have mainly been employed conventionally. At present, however, the electrolytic methods are most typically employed, because of the advantages of product purity and ease of operations.

The above advantages are brought about because the electrolytic ozone generators (electrolytic ozonizers) used in the electrolytic methods employ as the anode a lead oxide-based electrode performing an excellent ozone-evolving function. Due to such ozonizers, ozone can be obtained at high concentrations by conducting procedures almost the same as those in ordinary water electrolysis. In such ozone generators, pure water (ion-exchanged water) is used as the raw material and a perfluorocarbon sulfonic acid-based ion-exchange membrane is mainly used as a solid electrolyte, in combination with lead dioxide as the anode, to generate ozone. By this method, oxygen containing ozone gas at a concentration of about 15% can be obtained. The thus-produced ozone-containing oxygen may be used as it is or after being dissolved in water to give ozone-containing water. This electrolytic method is advantageous in that the apparatus has a simple structure and its operation is simple. Hence, attention is now focused on this apparatus, among small-sized ozonizers producing small amounts of ozone, which is regarded as an ozone generator that generates ozone at a high concentration.

However, this ozone generator with excellent performance has some drawbacks. The most serious of these is that high-purity pure water (or ion-exchanged water) should be fed to the ozone generator in order to protect its ion-exchange membrane; the pure water should be regulated so as to have an electrical conductivity of 1 $\mu$S/cm or less if possible, and 10 $\mu$S/cm or less at the worst. For maintaining such an electrical conductivity the ozone generator is equipped with an ion-exchange column packed with an ion-exchange resin before the electrolytic cell, and the feed water is allowed to pass through the ion-exchange column, where impurities are removed from the water, and the resulting water is then fed to the electrolytic cell.

The anolyte in the electrolytic cell, however, decreases in amount not only by consumption through electrolysis but also when part of the anolyte penetrates as migrant water through the ion-exchange membrane from the anode side to the cathode side together with positive ions. In the case of ordinary perfluorocarbon sulfonic acid-based ion-exchange membranes, the number of such migrant water molecules is from 2 to 2.5 per positive ion, such a migrant water amount being significantly large because it is four- to five-fold larger than the amount of water which undergoes electrolysis. Because of the above, a large quantity of pure water is fed to the electrolytic cell normally by using a relatively large-sized ion-exchange column. However, this conventional method involves problems in terms of cost and equipment construction, because the migrant pure water is discarded and because of the necessity of use of a large-sized ion-exchange column and of replacement of the ion-exchange resin with fresh one at short intervals. These problems constitute obstacles particularly to easy maintenance of the apparatus.

SUMMARY OF THE INVENTION

An object of the present invention is to provide an electrolytic ozone generator which, when used for ozone generation using high-purity water, enables the ion-exchange operation for producing pure water to be conducted at a minimal load without lowering ozone-generating efficiency, by effectively using the high-purity water to maintain the anolyte level at a predetermined value or a higher value.

The electrolytic ozone generator of the present invention comprises a feed tank in which water is stored, an ion-exchange column connected to the feed tank, a pump for feeding the stored water in the feed tank to the ion-exchange column, an electrolytic cell connected to the ion-exchange column and containing a solid electrolyte which is an ion-exchange membrane, an anode disposed tightly on one side of the solid electrolyte, and a cathode disposed tightly on the other side of the solid electrolyte, an electromagnetic valve connected to and disposed between the ion-exchange column and the electrolytic cell, and a hydrogen-separating column connected to the electrolytic cell and for separating hydrogen from a gas-liquid mixture sent from the electrolytic cell and circulating the resulting water to the feed tank, and in which the liquid level of the anolyte in the electrolytic cell is sensed, and, in the case where the liquid level is below a predetermined value, ion-exchanged water is fed from the ion-exchange column to the electrolytic cell by controlling the electromagnetic valve. In another aspect of this apparatus, in a case where the liquid level is not below the predetermined value, ion-exchanged water from which impurities have been removed in the ion-exchange column may be circulated to the feed tank by controlling the electromagnetic valve.

BRIEF DESCRIPTION OF THE DRAWING

The drawing is a diagrammatic vertical sectional view of one example of the electrolytic ozone generator according to the present invention.

DETAILED DESCRIPTION OF THE INVENTION

The electrolytic ozone generator of the present invention is characterized in that in order to minimize the amount of ion-exchanged water (pure water) used in the apparatus, the water which has undergone electrolysis and is taken out of the electrolytic cell is circulated to the feed tank and then fed again to the electrolytic cell.

The electrolytic cell employed in the ozone generator of the present invention has a structure of the so-called solid polymer electrolyte (spe) type in which an ion-exchange membrane, preferably a perfluorocarbon sulfonic acid-based one, is used as a solid electrolyte and this ion-exchange membrane is covered on both sides with an anode and a cathode. It is preferred that the ion-exchange membrane be a cation-permeable membrane. Use of a cation-permeable ion-exchange membrane is advantageous in that cation accumulation in the electrolytic cell and circulating system can be avoided because cations (e.g., metal ions) that have come into the anode chamber penetrate through the ion-exchange membrane to enter the cathode chamber, subsequently pass through the hydrogen-separating column and the feed tank, and then enter the ion-exchange column, where the cations are removed.

The material for the anode chamber in the electrolytic cell is not particularly limited, as long as it possesses ozone resistance. For example, titanium, Teflon (trademark), or the like can be used. As the material for the cathode chamber, titanium, stainless steel, Teflon, poly(vinyl chloride), polypropylene, or the like can be used.

The anode material and cathode material covering both sides of the above-described ion-exchange membrane are not particularly limited. For example, the anode material can be $\beta$-lead dioxide or the like and the cathode material can be a platinum group metal or an oxide thereof. In the case where $\beta$-lead dioxide is to be used as the anode material, it is desirable that a titanium substrate having micro pores be first covered with a prime coat of, for example, platinum, gold, etc., and a layer of $\beta$-lead dioxide then be formed thereon by electrodeposition. In the case where platinum, ruthenium oxide, or the like is to be used as the cathode material, it is desirable that a substrate made of titanium, stainless steel, or carbon and having micro pores be coated with a paste prepared by kneading a powder of platinum or other desired cathode material with a binder, and the coated substrate is then subjected to hot-press shaping. In place of covering substrates with electrode materials as described above, an electrolytic cell may be constructed by a method in which each electrode material is prepared separately from the ion-exchange membrane, the electrode materials and the ion-exchange membrane are superposed in the order of anode material/ion-exchange membrane/cathode material, and the superposed structure is bolted together after being sandwiched between feeder materials.

Preferred electrolysis conditions include a current density of about 50–150 A/dm$^2$, cell voltage of about 3.0–3.5 V, and liquid temperature of about 25–35° C. It should be noted that there are cases where according to the current quantity, the temperature rises too high due to heat generated by the electrolysis. It is preferable in such a case to lower the temperature by means of cooling water.

The feed water to be fed to the electrolytic cell is deionized beforehand in order to protect the ion-exchange membrane. For this purpose, a feed tank for storing tap water or other kind of water and an ion-exchange column and other necessary devices for deionizing the water in the fed tank are provided before the electrolytic cell, and the water in the feed tank is fed to the ion-exchange column by means of a pump. Since this ion-exchange column operates under a light load because it serves only to perform ion exchange of the water to be subjected to electrolysis, a small-sized column packed with a relatively small amount of an ion-exchange resin is sufficient as the ion-exchange column. It is desirable that the kind of the ion-exchange resin packed in the column be selected according to the kind of impurities contained in the water fed to the feed tank.

Upon application of electricity to the electrolytic cell and feeding of ion-exchanged water deionized in the ion-exchange column to the anode chamber of the electrolytic cell, the ion-exchanged water is electrolyzed to generate a gaseous mixture of ozone and oxygen. This gaseous mixture can be removed from the cell through an ozone-containing gas withdrawal opening provided at the top of the anode chamber. Alternatively, the ozone generated may be removed from the cell in the form of ozone-containing water in which the ozone-containing gas has been dissolved, from an ozone-containing water withdrawal opening provided at a proper position of the anode chamber. Further, part of the ion-exchanged water (electrolyte) in the anode chamber penetrates as migrant water through the ion-exchange membrane along with cations dissolved in the water, as described hereinabove. That is, the migrant water moves, in an amount of 2 to 2.5 water molecules per cation, through the ion-exchange membrane into the cathode chamber, where it is electrolyzed to evolve hydrogen gas, and the resulting electrolyte is removed from the cell together with the evolved hydrogen gas.

Accordingly, as the electrolysis proceeds, the amount of the electrolyte in the anode chamber decreases and hence its liquid level lowers. In the present invention, an electromagnetic valve is provided between the ion-exchange column and the electrolytic cell. This electromagnetic valve serves not only to prevent the back flow of evolved gases or the electrolyte from the electrolytic cell to thereby pressurize the anode chamber, but also to regulate the liquid level of the anolyte. That is, the electrolyte level in the anode chamber is sensed by a suitable sensor, and in the case where the electrolyte level has decreased below a predetermined value, the electromagnetic valve is controlled so that the ion-exchanged water in the ion-exchange column is fed as an electrolyte to the anode chamber in the electrolytic cell, to thereby maintain the electrolyte level in the anode chamber at or above the predetermined value. In the case where the above electrolyte level sensed by the sensor is not below the predetermined value, the pump is stopped to thereby suspend feeding of the water in the feed tank to the ion-exchange column, or the electromagnetic valve is controlled so that the ion-exchanged water in the ion-exchange column is circulated to the feed tank. By this circulation, the purity of the ion-exchanged water to be fed to the electrolytic cell is further improved.

Hydrogen gas evolved in the cathode chamber by electrolysis is removed from the cell along with the electrolyte in the cathode chamber, and then separated from the electrolyte in the hydrogen-separating column. Thereafter, at least part of the resulting water is circulated to the feed tank, subjected again to ion exchange, and then used in electrolysis. The reason why the water from which hydrogen has been separated is not directly fed to the anode chamber is that there are cases where this water contains impurities that have dissolved thereinto in the anode and cathode chambers, although the amount of such impurities is slight.

The water-sending from the cathode chamber through the hydrogen-separating column to the feed tank can be conducted without using a pump or similar means if the hydrogen-separating column is designed or disposed so that its uppermost part is at the highest level, because the pressure in the cathode chamber sends the catholyte to the hydrogen-separating column, and the water then flows naturally from the hydrogen-separating column into the feed tank due to the difference in elevation.

The water level in the feed tank also fluctuates, and it may be controlled by sensing the water level by a sensor or other means and supplying the feed tank with city water, ion-exchanged water, or other kind of water in an amount determined based on the sensed water level.

In the ozone generation using the apparatus of the present invention, water supply for the ozone generation can be conducted only in an amount substantially equal to the amount of water consumed by the electrolysis, and the ion-exchange column can be operated under a far lower load than those in conventional ozone generators because high-purity water is always fed to the ion-exchange column which performs ion exchange.

One example of the ozone generator according to the present invention is explained below with reference to the accompanying drawing.

To a box-shaped feed tank 1 there is connected a raw water feed pipe 3 provided with a valve 2 for feeding city water, well water, or other water. The water level in the feed tank 1 is sensed by known mechanical or electrical liquid level sensing means such as a flat sensor, an electrostatic capacitance sensor, etc., and in a case wherein the water level has gone below a predetermined value, raw water is supplied to the feed tank 1 by opening valve 2. To the bottom of the feed pipe 4. The other end of the stored water feed pipe 4, in which a pump 5 has been disposed, is connected to the bottom of an ion-exchange column 6 packed with an ion-exchange resin. To the top of the ion-exchange column 6 is connected an ion-exchanged water feed pipe 8 provided at its end with an electromagnetic valve 7 which is a three-way cock. Through the electromagnetic valve 7, this feed pipe 8 is connected to an electrolyte feed pipe 10 for feeding ion-exchanged water to an electrolytic cell 9, and is also connected to an ion-exchanged water circulation pipe 11 for circulating ion-exchanged water to the feed tank 1.

The electrolytic cell 9 is partitioned into an anode chamber 13 and a cathode chamber 14 by means of a solid electrolyte 12 constituted by an ion-exchange membrane of the perfluorocarbon sulfonic acid type or other type. The solid electrolyte 12 is covered on its anode chamber 13 side with an anode material 15 and on its cathode chamber 14 side with a cathode material 16. Numeral 17 denotes a withdrawal opening for an ozone-containing gas evolved in the anode chamber 13.

To the side wall of the cathode chamber 14 in the electrolytic cell 9 is connected the base end part of a withdrawal pipe 18 for a gas-liquid mixture of hydrogen gas evolved in the cathode chamber and the catholyte. The other end of the withdrawal pipe 18 is connected to a hydrogen-separating column 19. To the other side of the hydrogen-separating column 19 is connected a circulation pipe 20 for circulating the water from which hydrogen has been separated in the hydrogen-separating column 19 back to the feed tank 1.

In practicing ozone generation using the ozone generator having the above-described construction, electricity is applied to the electrolytic cell, with the anode chamber 13 and the cathode chamber 14 being filled with an electrolyte (e.g., water). Upon the application of electricity, an ozone-containing gas is generated in the anode chamber and is removed from the cell through the withdrawal opening 17. Further, part of that anolyte in the anode chamber which contains hydrated cations penetrates through the solid electrolyte 12 to enter the cathode chamber 14. Therefore, the amount of the electrolyte in the anode chamber 13 decreases because a part of the electrolyte is consumed by the electrolysis and another part migrates through the solid electrolyte 12 to the cathode chamber 14. Thus, the water level in the anode chamber lowers.

On the other hand, the water stored in the feed tank 1 is led to the ion-exchange column 6 by means of the pump 5 and converted to ion-exchanged water in the ion-exchange column 6. In the case wherein the anolyte level in the electrolytic cell 9 is not below a predetermined value, the ion-exchanged water removed from the ion-exchange column 6 is returned to the feed tank 1 by controlling the cock direction for the electromagnetic valve. In the case wherein the anolyte level is found to have been lowered to a value below a predetermined value by means of a suitable sensor, the ion-exchanged water is fed to the anode chamber 13 in the electrolytic cell 9 by controlling the electromagnetic valve. Due to this operation, the anolyte level in the anode chamber 13 is always kept at or above a predetermined value. As a result, the anode material is in sufficient contact with the anolyte and ozone generation is conducted efficiently.

The catholyte is also consumed by the electrolysis. However, the catholyte level increases as the electrolysis proceeds, because the amount of the migrant water from the anode chamber is larger than that of the catholyte consumed by the electrolysis. The increased amount of the catholyte is led through the withdrawal opening 18 to the hydrogen-separating column 19, where hydrogen is separated. At least part of the resulting water is circulated through the circulation pipe 20 back to the feed tank 1, stored in the feed tank 1, subsequently subjected to ion exchange in the same manner as described above, and then reused in the electrolysis.

As described above, the ozone generator according to the present invention is advantageous in that the amounts of the required ion-exchange resin and feed water can be greatly reduced and the ion-exchange column can hence be reduced in size, because the gas-liquid mixture containing hydrogen removed from the cathode chamber is subjected to hydrogen separation and then circulated to the feed tank in which water to be supplied to the anode chamber is stored. In addition, since the anolyte level is sensed so that feeding of ion-exchanged water to the electrolytic cell can be conducted exactly in the necessary minimum quantity, the ion-exchanged water can be used in electrolysis without wasting it, and the electrolysis results in almost no wastewater.

Moreover, in the case wherein there is no need for ion-exchanged water to be fed from the ion-exchange column to the electrolytic cell, the ion-exchanged water can be circulated to the feed tank and subjected again to ion exchange. By this ion-exchanged water circulation, the purity of the ion-exchanged water fed to the electrolytic cell can be improved further, without substantially increasing the load placed on the ion-exchange column.

The present invention is explained in more detail by reference to the following example in which ozone generation is conducted using an ozone generator according to the present invention. However, the example is not to be construed as limiting the scope of the invention.

EXAMPLE

According to the accompanying drawing, an ozone generator was constructed as follows.

Using NAFION (a perfluorosulfonic acid membrane which is a trademark product of du Pont) 117 having a length of 10 cm and a width of 10 cm as a solid electrolyte, an electrolytic cell having an electrode area of 1 dm$^2$ a depth of 15 cm was constructed, with the anode material being $\beta$-lead dioxide and the cathode material being platinum. Before the electrolytic cell, an ion-exchange column was provided which had been packed with an anion-exchange resin and a cation-exchange resin as ion-exchange resins. A feed tank was further disposed before the ion-exchange column via a pump. Tap water was introduced into the feed tank while the fed amount of the water was monitored in order to maintain the water level in the tank constant.

Sensor setting was conducted such that when the anolyte level became lower than 12 cm, an electromagnetic valve operated to feed ion-exchanged water to the electrolytic cell. In the case where the anolyte level was 14 cm or higher, the ion-exchanged water removed from the ion-exchange column was circulated to the feed tank.

A gas-liquid mixture withdrawn from the cathode chamber was sent to a hydrogen-separating column and hydrogen was separated therein. The resulting water was circulated back to the feed tank while the circulated amount was monitored.

Supplying an electric current of 100 A to the abovedescribed electrolytic cell, electrolysis was continued for 1,000 hours. As a result, the current efficiency for ozone generation during the electrolysis was 13% on the average. The state of the inside of the anode chamber after the 1,000-hour electrolysis was almost unchanged from the initial state thereof, except that about 1 ppm of fluorine anions were present in the anolyte after the electrolysis. On the other hand, the state of the cathode chamber was also almost unchanged through the electrolysis. That is, no deposits were observed except that a trace amount of lead had been deposited on the cathode material surface, and the pure water remained almost unchanged.

In the above electrolysis, the amount of tap water supplied during the 1,000 hours was 35 liters and the amount of water circulated during the 1,000 hours was 140 liters, showing that the amount of the electrolyte consumed by the electrolysis ($\approx$ the amount of supplied tap water) is slight, whereas the amount of water that passed through the electrolytic cell ($\approx$ the amount of circulated water) is large. Thus, it can be seen that by use of the ozone generator of this example, the amount of supplied water can be reduced to a value only fractionally as large as the conventional supplied water amount ($\approx$ the amount of water passing through the electrolytic cell).

While the invention has been described in detail and with reference to specific embodiments thereof, it will be apparent to one skilled in the art that various changes and modifications can be made therein without departing from the spirit and scope thereof.

What is claimed is:

1. An electrolytic ozone generator which comprises a feed tank in which water is stored, an ion-exchange column connected to the feed tank, a pump for feeding the stored water in the feed tank to the ion-exchange column, an electrolytic cell connected to the ion-exchange column and containing a solid electrolyte which is an ion-exchange membrane, an anode disposed tightly on one side of the solid electrolyte, and a cathode disposed tightly on the other side of the solid electrolyte, an electromagnetic valve connected to and disposed between the ion-exchange column and the electrolytic cell, and a hydrogen-separating column connected to the electrolytic cell for separating hydrogen from a gas-liquid mixture sent from the electrolytic cell with means to circulate the resulting water to the feed tank, and a means by which the liquid level of the anolyte in the electrolytic cell is sensed, and, in a case wherein said liquid level is below a predetermined value, ion-exchanged water is fed from the ion-exchange column to the electrolytic cell by controlling the electromagnetic valve.

2. An electrolytic ozone generator which comprises a feed tank in which water is stored, an ion-exchange column connected to the feed tank, a pump for feeding the stored water in the feed tank to the ion-exchange column, an electrolytic cell connected to the ion-exchange column and containing a solid electrolyte which is an ion-exchange membrane, an anode disposed tightly on one side of the solid electrolyte, and a cathode disposed tightly on the other side of the solid electrolyte, an electromagnetic valve connected to and disposed between the ion-exchange column and the electrolytic cell, and a hydrogen-separating column connected to the electrolytic cell for separating hydrogen from a gas-liquid mixture sent from the electrolytic cell with means to circulate the resulting water to the feed tank, and a means by which the liquid level of the anolyte in the electrolytic cell is sensed, and, in a case wherein said liquid level is below a predetermined value, ion-exchange water is fed from the ion-exchange column to the electrolytic cell by controlling the electromagnetic valve, whereas in a case wherein said liquid level is not below the predetermined value, ion-exchanged water is circulated to the feed tank by controlling the electromagnetic valve.

* * * * *